United States Patent
Grabowski et al.

(10) Patent No.: US 9,527,224 B2
(45) Date of Patent: Dec. 27, 2016

(54) ENDLESS FLEXIBLE MEMBERS WITH A POLYMERIC RELEASE AGENT FOR IMAGING DEVICES

(75) Inventors: Edward F. Grabowski, Webster, NY (US); Yuhua Tong, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 404 days.

(21) Appl. No.: 13/030,108

(22) Filed: Feb. 17, 2011

(65) Prior Publication Data

US 2012/0211704 A1    Aug. 23, 2012

(51) Int. Cl.
*B29C 33/56* (2006.01)
*H01B 1/24* (2006.01)

(52) U.S. Cl.
CPC ............... *B29C 33/56* (2013.01); *H01B 1/24* (2013.01)

(58) Field of Classification Search
USPC ....... 430/106.1, 111.41, 110.3, 109.3, 109.4; 359/296
See application file for complete search history.

(56) References Cited

U.S. PATENT DOCUMENTS

| | | | |
|---|---|---|---|
| 7,230,750 B2 * | 6/2007 | Whitesides | B82Y 30/00 345/107 |
| 2001/0028988 A1 * | 10/2001 | Magome et al. | 430/106.1 |
| 2002/0044803 A1 * | 4/2002 | Kobaru et al. | 399/323 |
| 2002/0058130 A1 * | 5/2002 | Tateishi et al. | 428/195 |
| 2006/0155085 A1 * | 7/2006 | Kohgo et al. | 526/127 |
| 2009/0036624 A1 * | 2/2009 | Okimoto | C08F 220/14 526/245 |

FOREIGN PATENT DOCUMENTS

EP        930290    *  7/1999

* cited by examiner

*Primary Examiner* — Monique Peets
(74) *Attorney, Agent, or Firm* — Marylou J. Lavoie, Esq. LLC

(57) ABSTRACT

Flexible members for use in imaging devices comprise a polymerizable release agent.

14 Claims, No Drawings

ENDLESS FLEXIBLE MEMBERS WITH A POLYMERIC RELEASE AGENT FOR IMAGING DEVICES

FIELD

A novel flexible member composition, such as, an intermediate transfer belt (ITB), such as, an endless belt having an annular main body, for use in an electrophotographic imaging device is provided. The imaging device produces a fixed toner image on a recording medium.

BACKGROUND

In the electrophotographic imaging arts, an image forming apparatus forms a static latent image by exposure of a surface of a charged photosensitive body to patterns of light, develops that static latent image to form a toner image, and finally transfers the toner image to a recording medium at a predetermined transfer position, thereby forming an image thereon.

One such image forming apparatus employs, in the process of image formation and development, an endless belt that is stretched around support rolls, and circulates and moves as a unit, carrying the formed toner image to a transfer position. Alternatively, the endless belt operates as a unit that transfers the recording medium to the transfer position In an image forming apparatus that forms a color image, because toner images of individual different colors are superimposed on one another, an endless belt is used as a unit that carries the toner images of different color which are sequentially applied or received in building the final composite color image. An endless belt also can be used as a unit for transferring a recording medium that sequentially receives toner images of different color. See, for example, U.S. Pat. No. 7,677,848 and U.S. Publ. No. 20100279217, herein incorporated by reference in entirety.

Image forming apparatus with high endurance capable of withstanding, for example, temperature variation and high volume output, are desirable. Hence, materials to enhance ITB performance and preparation are needed.

Endless flexible belts can be made by producing a film on or attached to a mold, mandrel or form, which terms and structures are considered equivalents herein. A film-forming solution or composition is applied to the form by, for example, dipping, flowing, spraying or other known method, and the solution or composition can be dispersed or distributed to form a thin film, for example, by centrifugation over the inner wall of a hollow form, for example, a cylindrical form.

When using such molding methods, the film must be separated from the molding form, and preferably with minimal stress, deformation, damage and the like to the film. Moreover, it is desirable that the film be removed easily and quickly from the molding form.

Generally, an external release agent is applied to the mold prior to applying the film-forming composition. However, the external release agent must be inert to the film or the external release agent will be incorporated therein and thereto. That may lead to imperfections in the surface of the film.

Alternatively, an internal release agent can be incorporated into the film-forming composition. However, during drying, the internal release agent often migrates within the forming film to the surface of the film adjacent to the mold surface. The internal release agent thus situated can have a detrimental impact on the mold surface.

SUMMARY

According to aspects disclosed herein, there is provided a film-forming composition for making flexible members for use in electrophotography, such as, a flexible image transfer member, such as, an intermediate transfer belt (ITB), wherein a coating solution comprises a polymerizable release agent that facilitates removal of the formed film from a mold, mandrel, form and the like, and that also can serve as a leveling agent that facilitates dispersal of the solution on the mold, form or structure to facilitate obtaining a film with a smooth surface.

Another disclosed embodiment comprises an imaging or printing device comprising a film, such as, an ITB, comprising a polymerized or polymeric release agent, wherein the polymerization of the release agent occurred during the drying and/or curing of the film.

DETAILED DESCRIPTION

As used herein, the term, "electrophotographic," or grammatic versions thereof, is used interchangeably with the term, "xerographic." In some embodiments, such as, in the case of forming a color image, often, individual colors of an image are applied sequentially. Thus, a, "partial image," is one which is composed of one or more colors prior to application of the last of the colors to yield the final or composite color image. "Flexible," is meant to indicate ready deformability, such as observed in a belt, web, film and the like, that, for example, are adaptable to operate and for use with, for example, rollers.

For the purposes of the instant application, "about," is meant to indicate a deviation of no more than 20% of a stated value or a mean value. Other equivalent terms include, "substantial," and "essential," or grammatic forms thereof.

In electrophotographic (xerographic) reproducing or imaging devices, including, for example, a digital copier, an image-on-image copier, a contact electrostatic printing device, a bookmarking device, a facsimile device, a printer, a multifunction device, a scanning device and any other such device, a printed output is provided, whether black and white or color, or a light image of an original is recorded in the form of an electrostatic latent image on an imaging device component, for example, which may be present as an integral component of an imaging device or as a replaceable component or module of an imaging device, and that latent image is rendered visible using electroscopic, finely divided, colored or pigmented particles, or toner. The imaging device component can be a flexible member, such as, a transfer member.

A flexible imaging member can comprise an intermediate transfer member, such as, an intermediate transfer belt (ITB), a fuser belt, a pressure belt, a transfuse belt, a transport belt, a developer belt and the like. Such belts can comprise a single layer, or plural layers comprising a support layer and one or more layers of particular function.

Hence, such transfer members can be present in an electrophotographic image forming device or printing device. In the case of an ITB, a photoreceptor is electrostatically charged and then is exposed to a pattern of activating electromagnetic radiation, such as, light, which dissipates the charge in the illuminated areas of the imaging device component thereby leaving behind an electrostatic latent image in the non-illuminated areas. The electrostatic latent image then is developed at one or more developing stations to form a visible image or a partial image, by depositing finely divided electroscopic colored, dyed or pigmented particles, or toner, for example, from a developer composition, on the surface of the imaging component. The resulting visible image on the photoreceptor is transferred to an ITB for subsequent transfer to a receiving member or for further developing of the image, such as, building additional colors on successive partial images. The final image then is transferred to a receiving member, such as, a paper, a cloth, a polymer, a plastic, a metal and so on, which can be presented in any of a variety of forms, such as, a flat surface, a sheet or a curved surface. The transferred particles are fixed or fused to the receiving member by any of a variety of means, such as, by exposure to elevated temperature and/or elevated pressure to yield the image in a stable form on the receiving member.

It can be desirable to minimize transferring dry toner carrier or liquid carrier to the receiving member, that is, for example, a paper. Therefore, it can be advantageous to transfer the developed image on a photoreceptor to an intermediate transfer web, belt, roll or member, and subsequently to transfer the developed image from the intermediate transfer member to a permanent or ultimate substrate, or receiving member.

An intermediate transfer member also finds use in color systems and other multi-imaging systems. In a multi-imaging system, more than one image is developed, that is, for example, a series of partial images are developed, which can be superimposed in register. Each image is formed on the photoreceptor, is developed at individual stations and is transferred to an intermediate transfer member. Each of the images may be formed on the photoreceptor, developed sequentially and then transferred to the intermediate transfer member or each image may be formed on the photoreceptor developed and transferred in register to the intermediate transfer member. See for example, U.S. Pat. Nos. 5,409,557; 5,119,140; and 5,099,286, the contents of which are incorporated herein by reference in entirety.

To obtain quality image transfer, that is, to minimize image shear, the displacement of a transfer member due to disturbance during transfer member driving can be reduced by limiting the thickness of the support or substrate, such as, an intermediate transfer belt, for example, to about 50 µm. Thus, the thickness of the substrate or support can be from about 50 µm to about 150 µm or from 70 µm to about 100 µm.

The support, substrate or layer can be made of known materials, such as, a synthetic material, such as, a resin, a fibrous material and so on, and combinations thereof, see, for example, "The Encyclopedia of Engineering Materials and Processes," Reinhold Publishing Corporation Chapman and Hall, Ltd., London, page 863, 1963, the entire disclosure of which is hereby incorporated herein by reference.

Suitable synthetic materials include liquid crystal polymers, graphites, nylons, rayons, polyesters, a Kevlar (aromatic polyamide obtainable from E. I. dupont de Nemours), a Nomax, a Peek (polyethoxyether ketones available from ICI), polyvinyl fluorides (e.g., a Tedlar available from E. I. dupont de Nemours), polyvinylidene fluorides (e.g., Kynar 7201, Kynar 301F and Kynar 202, all available from Pennwalt Co.), polytetrafluoroethylenes (e.g. a Teflon, available from E. I. duPont de Nemours & Co.) and other fluorocarbon polymers; a Viton B-50 (blend of vinylidene fluoride and hexafluoropropylene copolymer); a Viton GF (blend of vinylidene fluoride, hexafluoropropylene and tetrafluoroethylene terpolymer), polybutadienes and copolymers with styrene, vinyl/toluenes, acrylates, polyaryl sulfones, polyethylenes, polypropylenes, polyimides, polyethylpentenes, polysulfides, such as, polyphenylene sulfides, polystyrene and acrylonitrile copolymers, polyvinylchloride and polyvinyl acetate copolymers and terpolymers, silicones, acrylics and copolymers, alkyd polymers, amino polymers, cellulosic resins and polymers, epoxy resins and esters, polyamides, phenoxy polymers, phenolic polymers, phenylene oxide polymers, polycarbonates (e.g. Makrolon 5705, available from Bayer Chemical Co., Merlon M39, available from Mobay Chemical Co. or Lexan 145, available from General Electric Co.), polysulfones (e.g. P-3500, available from Union Carbide Corp.), polyesters (e.g. PE-100 and PE-200, available from Goodyear Tire and Rubber Co.), polyarylates, acrylics, polyarylsulfones, polybutylenes, polyether sulfones, polyphenylenesulfides, polyurethanes, poly (amide-imides) (e.g. A1830, available from AMOCO Chemical Corp.), copolyesters (Kodar Copolyester PETG 6763 available from Eastman Kodak Co.), polyetherimides (e.g. available from General Electric Co.), polyarylethers and the like, and mixtures thereof. Polycarbonate polymers may be made according to methods known in the art, for example, from 2,2-bis(4-hydroxyphenol)propane; 4,4'-dihydroxy-diphenyl-1,1-ethane; 4,4'-dihydroxy-diphenyl-1,1-isobutane; 4,4'-dihydroxy-diphenyl-4-heptane; 4,4'-dihydroxy-diphenyl-2,2-hexane; 4,4'-dihydroxy-triphenyl-2,2,2-ethane; 4,4'-dihydroxy-diphenyl-1,1-cyclohexane; 4,4'-dihydroxy-diphenyl-β,β-decahydronaphthalene;
cyclopentane derivatives of 4,4'dihydroxy-diphenyl-β,β-decahydronaphthalene; 4,4'-dihydroxy-diphenyl-sulphone; and the like, or blends and mixtures thereof. Glass fibers also may be employed.

A transfer member or device can have more than one layer. In that event, the first layer, when viewing a cross section of the multilayered transfer member with the surface to which the image is affixed oriented at the top, is the lowest or bottom layer of the transfer member, and the last added or most superficial layer (in the cross section depiction is the uppermost or top layer) generally is one having a low surface energy, i.e., material comprising an electrically conducting agent dispersed thereon having a contact angle of not less than about 70° or at least about 70° with respect to a water droplet as represented by wettability by water. The term, "wettability by water," as used herein is meant to indicate the angle of contact of a material constituting the surface layer as a specimen with respect to a water droplet.

Electrical property regulating materials can be added to the substrate or to a layer superficial thereto to regulate electrical properties, such as, surface and bulk resistivity, dielectric constant and charge dissipation. In general, electrical property regulating materials can be selected based on the desired resistivity of the film. High volume fractions or loadings of the electrical property regulating materials can be used so that the number of conductive pathways is always well above the percolation threshold, thereby avoiding extreme variations in resistivity. The percolation threshold of a composition is a volume concentration of dispersed phase below which there is so little particle to particle contact that the connected regions are small. At higher concentrations than the percolation threshold, the connected regions are large enough to traverse the volume of the film, see, for example, Scher et al., J Chem Phys, 53(9)3759-3761, 1970, which teaches the effects of density in percolation processes.

Particle shape of the electrical property regulating material can influence volume loading. Volume loading can depend on whether the particles are, for example, spherical, round, irregular, spheroidal, spongy, angular or in the form of flakes or leaves. Particles having a high aspect ratio do not require as high a loading as particles having a relatively lower aspect ratio. Particles which have relatively high aspect ratios include flakes and leaves. Particles which have a relatively lower aspect ratio include spherical and round particles.

The percolation threshold is practically within a range of a few volume % depending on the aspect ratio of the loadent. For any particular particle resistivity, the resistivity of the coated film can be varied over about one order of magnitude by changing the volume fraction of the resistive particles in the layer. The variation in volume loading enables fine tuning of resistivity.

The resistivity varies approximately linearly to the bulk resistivity of the individual particles and the volume fraction of the particles in the support or layer. The two parameters can be selected independently. For any particular particle resistivity, the resistivity of the reinforcing member can be varied over roughly an order of magnitude by changing the volume fraction of the particles. The bulk resistivity of the particles is preferably chosen to be up to three orders of magnitude lower than the bulk resistivity desired in the member. When the particles are mixed with the support or layer in an amount above the percolation threshold, the resistivity of the resulting reinforcing member can decrease in a manner proportional to the increased loading. Fine tuning of the final resistivity may be controlled on the basis of that proportional increase in resistivity.

The bulk resistivity of a material is an intrinsic property of the material and can be determined from a sample of uniform cross section. The bulk resistivity is the resistance of such a sample multiplied by the cross sectional area divided by the length of the sample. The bulk resistivity can vary somewhat with the applied voltage.

The surface or sheet resistivity (expressed as ohms/square, $\Omega/\square$) is not an intrinsic property of a material because that metric depends on material thickness and contamination of the material surface, for example, with condensed moisture. When surface effects are negligible and bulk resistivity is isotropic, the surface resistivity is the bulk resistivity divided by the reinforcing member thickness. The surface resistivity of a film can be measured without knowing the film thickness by measuring the resistance between two parallel contacts placed on the film surface. When measuring surface resistivity using parallel contacts, one uses contact lengths several times longer than the contact gap so that end effects do not cause significant error. The surface resistivity is the measured resistance multiplied by the contact length to gap ratio.

Particles can be chosen which have a bulk resistivity slightly lower than the desired bulk resistivity of the resulting member. The electrical property regulating materials include, but are not limited to pigments, quaternary ammonium salts, carbons, dyes, conductive polymers and the like. Electrical property regulating materials may be added in amounts ranging from about 1% by weight to about 50% by weight of the total weight of the support or layer or from about 5% to about 35% by weight of the total weight of the support or layer.

Thus, for example, carbon black systems can be used to make a layer or layers conductive. That can be accomplished by using one variety or more than one variety of carbon black, that is, carbon blacks with different, for example, particle geometry, resistivity, chemistry, surface area and/or size. Also, one variety of carbon black or more than one variety of carbon black can be used along with other non-carbon black conductive fillers.

An example of using more than one variety of carbon black, each having at least one different characteristic from the other carbon black, includes mixing a structured black, such as, VULCAN® XC72, having a steep resistivity slope, with a low structure carbon black, such as, REGAL 250R®, having lower resistivity at increased filler loadings. The desired state is a combination of the two varieties of carbon black which yields a balanced controlled conductivity at relatively low levels of filler loading, which can improve mechanical properties.

Another example of mixing carbon blacks comprises a carbon black or graphite having a particle shape of a sphere, flake, platelet, fiber, whisker or rectangle used in combination with a carbon black or graphite with a different particle shape, to obtain good filler packing and thus, good conductivity. For example, a carbon black or graphite having a spherical shape can be used with a carbon black or graphite having a platelet shape. The ratio of carbon black or graphite fibers to spheres can be about 3:1.

Similarly, by using relatively small particle size carbon blacks or graphites with relatively large particle size carbon blacks or graphite, the smaller particles can orient in the packing void areas of the polymer substrate to improve particle contact.

In another embodiment, a mixture of carbon black can comprise a first carbon black having a BET surface area of from about 30 $m^2/g$ to about 700 $m^2/g$ and a second carbon black having a BET surface area of from about 150 $m^2/g$ to about 650 $m^2/g$.

Also, combinations of resistivity can be used to yield a shallow resistivity change with filler loading. For example, a carbon black or other filler having a resistivity of about $10^{-1}$ to about $10^3$ ohms-cm, or about $10^{-1}$ to about $10^2$ ohms-cm used in combination with a carbon black or other filler having a resistivity of from about $10^3$ to about $10^7$ ohms-cm can be used.

Other fillers, in addition to carbon blacks, can be added to the polymer, resin or film-forming composition and dispersed therein. Suitable fillers include metal oxides, such as, magnesium oxide, tin oxide, zinc oxide, aluminum oxide, zirconium oxide, barium oxide, barium titanate, beryllium oxide, thorium oxide, silicon oxide, titanium dioxide and the like; nitrides, such as, silicon nitride, boron nitride and the like; carbides, such as, titanium carbide, tungsten carbide, boron carbide, silicon carbide and the like; composite metal oxides such as zircon ($ZrO_2.Al_2O_3$), spinel ($MgO.Al_2O_3$), mullite ($3Al_2O_3.2SiO_2$), sillimanite ($Al_2O_3.SiO_2$), and the like; mica; and combinations thereof. Optional fillers can be present in the polymer/carbon black coating in an amount of from about 20% to about 75% by weight of total solids, or from about 40% to about 60% by weight of total solids.

The resistivity of the coating layer can be from about $10^7$ to about $10^{13}\Omega/\square$, from about $10^8$ to about $10^{12}\Omega/\square$ or from about $10^9$ to about $10^{11}\Omega/\square$.

In another embodiment, a thin insulating layer of the polymer/carbon black is used and has a dielectric thickness of from about 1 μm to about 10 μm or from about 4 μm to about 7 μm.

The hardness of the polymer/carbon black coating can be less than about 85 Shore A, from about 45 Shore A to about 65 Shore A, or from about 50 Shore A to about 60 Shore A.

In another embodiment, the surface can have a water contact angle of at least about 60°, at least about 75°, at least about 90°, or at least about 95°.

Flexible members, such as, flexible transfer members can be prepared using methods known in the art. For example, metals, synthetic materials or other film-forming compositions as taught herein or as known in the art to form the first layer of the member, such as, a resin-forming monomer, that is, a monomer that polymerizes into a resin, such as, a synthetic resin, such as, one which is a thermosetting polymer or a thermoplastic polymer, that is, polymerizes on exposure to a suitable heat or a suitable elevated temperature, can be electrodeposited on a mandrel, mold or form, or on the interior surface of a sleeve electrode, mandrel, mold or form. Examples of such methods are described in U.S. Pat. Nos. 4,747,992 and 4,952,293, which are hereby incorporated herein by reference. Other techniques for applying materials include liquid and dry powder spray coating, dip coating, flow coating, wire wound rod coating, fluidized bed coating, powder coating, electrostatic spraying, sonic spraying, blade coating and the like. If a coating is applied by spraying, spraying can be assisted mechanically and/or electrically, such as, by electrostatic spraying. Thus, a film-forming composition can comprise a polymerizable resin monomer that polymerizes to form, for example, a resin suitable for use in an imaging device, such as, an intermediate transfer belt, when exposed to a suitable condition, such as, heat or a suitable elevated temperature.

In such cases where a film-forming solution or composition is applied to a form, a mandrel, a mold and the like, removal of the formed film intact and with minimal damage, with little difficulty or intervention or both are desirable. Inclusion of a polymerizable release agent in the solution added directly to the form, mandrel, mold and the like facilitates or enhances such subsequent facile removal of the dried and/or cured film therefrom without the need for an external release agent that is applied to the mold, mandrel, form and so on before the film-forming composition is added thereto. The polymerizable release agent can reduce solution surface tension thereby enhancing spreading and leveling of the solution on the mold, form, mandrel and the like. That can result in a film comprising a polymerized or polymeric release agent comprising a surface having reduced imperfections. The polymeric release agent minimizes migration of the release agent in the forming film.

The polymerizable release agent of interest is bifunctional comprising a chemical group suitable for enhancing the rapid and ready removal or release of a formed film containing same from a mold, mandrel, form and the like; and a thermally reactive functional group that results in polymerization of the release agent during the drying and/or curing steps in forming a film for use in an imaging device.

Thus, a suitable chemical group that provides the removal function, that is, a rapid and/or ready removal of the formed film from the mold, and which is compatible with imaging includes compounds or groups carrying fluorine or silicon, such as, a carbon-fluorine structure, as is found in fluorocarbons, or as found in a silicon-containing group, such as, a composition comprising silicon, which can be an analog of a hydrocarbon, such as, a silane or other silyl derivative.

The thermally-reactive functional group of a release agent of interest is one which on exposure to a suitable elevated temperature, such as, about 110° C. or more, about 120° C. or more, about 130° C. or more, about 140° C. or more, about 150° C. or more, or greater, is catalyzed to polymerize, that is, a thermally-induced polymerization of the release agent occurs to form a polymerized or polymeric release agent. Suitable such groups for a release agent of interest which polymerizes on exposure to a suitable elevated temperature include acrylates, hydroxyls, carboxylates, aminos, isocyanates, alkylsilanes and methacrylates.

Generally the release agent is liquid at room temperature or at least is miscible with or soluble in solvents normally used to make films for imaging, such as, dimethylformamide and N-methyl-pyrrolidone.

The polymerizable release agent is included in the film-forming solution that is applied directed to the mold, mandrel or form, at an amount, by weight, of no more than about 10%, no more than about 8%, no more than about 6% or no more than about 5% by weight of the film-forming solution or composition.

Examples of such bifunctional release agents include 2,2,2-trifluoro methacrylate (Polysciences Inc.), trifluoroethyl methacrylate, 1,1,1,3,3,3-hexafluoro isopropyl methacrylate (Sigma-Aldrich), 2,2,2-trifluoro-1-(trifluoromethyl) ethyl methacrylate, 1,1,1,3,3,3-hexafluoro isopropyl acrylate (Sigma-Aldrich), trifluoromethyl methacrylate, 3-methacryloxypropyltrimethoxysilane (SigmaSil), 3-methacryloxypropylethoxysilane (SigmaSil), methacryloxymethyltriethoxysilane (Power Chemical Corp.), acryloxypropyltrimethoxysilane (Power Chemical Corp.) and the like.

The formed film can be incorporated into an imaging device, such as, a color imaging device, for example, to serve as an intermediate transfer belt to receive partial images of varying and increasing colors to produce color images.

Various aspects of the embodiments of interest now will be exemplified in the following non-limiting examples.

EXAMPLES

Example 1

Polyphenylsulfone from BASF (2.0 g) was dissolved in 8.0 g of N-methylpyrrolidone. Trifluoroethyl methacrylate (Aldrich, 0.02 g) and Carbon Black Special 4 (Evonik Degussa Corp., 0.35 g) were added. The solution was balled-milled for 15 hours. The resulting mixture was coated on a stainless steel substrate by a Bird Bar, and then dried at 75° C. for 30 minutes, at 135° C. for 25 minutes, and then at 190° C. for 30 minutes.

The ITB film released well from the substrate. The surface of the stainless steel substrate was clean. The film had a very smooth surface.

Comparative Example 1

The coating solution of Example 1 was used, except that 0.04 g of a non-polymerizing release agent, Polystep P-34 (Stepan Co.), replaced the methacrylate. The coating procedure and drying conditions were the same as in Example 1.

The film did not release well from the substrate and the film presented with a degree of an orange-peel surface. The surface of the stainless steel substrate that was revealed when the film was removed contained yellow residual spots.

Example 2

The films of Example 1 and Comparative Example 1 were tested for various physical properties practicing materials and methods as known in the art.

The film of Example 1 had a water contact angle about 94°. The film of Comparative Example 1 had a water contact angle of about 82°.

For surface resistivity, the film of Example 1 had a reading of $3.26 \times 10^{10} \Omega/\square$ at 1000 volts whereas the film of Comparative Example 1 had a reading of $1.12 \times 10^{10} \Omega/\square$ at 1000 volts. The higher surface resistivity of the film of Example 1 may be related to presence of the fluoropolymer release agent of interest on the surface of the ITB.

Example 3

Trifluorethyl methacrylate was also used in a phenoxy resin, a polyamideimide and a polyimide film.

All references cited herein are herein incorporated by reference in entirety.

It will be appreciated that variants of the above-disclosed and other features and functions, or alternatives thereof, may be combined with other and different systems or applications. Various presently unforeseen or unanticipated alternatives, changes, modifications, variations or improvements subsequently may be made by those skilled in the art to and based on the teachings herein without departing from the spirit and scope of the embodiments, and which are intended to be encompassed by the following claims.

What is claimed is:

1. A composition for forming a flexible transfer film comprising a polymerizable resin monomer or a resin and an internal bifunctional polymerizable release agent, wherein said polymerizable release agent is present in an amount of no more than about 8% by weight, wherein said polymerizable release agent is selected from the group consisting of 2,2,2-trifluoro methacrylate, trifluoroethyl methacrylate, 1,1,1,3,3,3-hexafluoro isopropyl methacrylate, 2,2,2-trifluoro-1-(trifluoromethyl) ethyl methacrylate, 1,1,1,3,3,3-hexafluoro isopropyl acrylate, trifluoromethyl methacrylate, 3-methacryloxypropyltrimethoxysilane, 3-methacryloxypropylethoxysilane, methacryloxymethyltriethoxysilane and acryloxypropyltrimethoxysilane, and said release agent polymerizes on exposure to an elevated temperature.

2. The composition of claim 1, further comprising an electrical property regulating material.

3. The composition of claim 2, wherein said material comprises a carbon black.

4. The composition of claim 1, wherein said polymerizable resin monomer polymerizes on exposure to an elevated temperature.

5. A flexible transfer film comprising a resin and an internal bifunctional polymeric release agent selected from the group consisting of 2,2,2-trifluoro methacrylate, trifluoroethyl methacrylate, 1,1,1,3,3,3-hexafluoro isopropyl methacrylate, 2,2,2-trifluoro-1-(trifluoromethyl) ethyl methacrylate, 1,1,1,3,3,3-hexafluoro isopropyl acrylate, trifluoromethyl methacrylate, 3-methacryloxypropyltrimethoxysilane, 3-methacryloxypropylethoxysilane, methacryloxymethyltriethoxysilane and acryloxypropyltrimethoxysilane, wherein said polymerizable release agent is present in an amount of no more than about 8% by weight.

6. The member of claim 5, further comprising an electrical property regulating material.

7. The member of claim 6, wherein said material comprises a carbon black.

8. An imaging device comprising the transfer film of claim 5.

9. A method of preparing a flexible transfer film without using an external release agent comprising:
   a) applying to a form, mold or mandrel a film-forming composition comprising a resin-forming monomer or a resin and a bifunctional polymerizable release agent selected from the group consisting of 2,2,2-trifluoro methacrylate, trifluoroethyl methacrylate, 1,1,1,3,3,3-hexafluoro isopropyl methacrylate, 2,2,2-trifluoro-1-(trifluoromethyl) ethyl methacrylate, 1,1,1,3,3,3-hexafluoro isopropyl acrylate, trifluoromethyl methacrylate, 3-methacryloxypropyltrimethoxysilane, 3-methacryloxypropylethoxysilane, methacryloxymethyltriethoxysilane and acryloxypropyltrimethoxysilane, which polymerizes on exposure to an elevated temperature, to yield a coated form, mold or mandrel, wherein said polymerizable release agent is present in an amount of no more than about 8% by weight;
   b) exposing the coated form, mold or mandrel of step a) to an elevated temperature to yield a polymerized flexible transfer film; and
   c) removing said flexible transfer film from said form, mold or mandrel.

10. The method of claim 9, wherein said composition comprises an electrical property regulating material.

11. The method of claim 10, wherein said material comprises a carbon black.

12. The composition of claim 1, wherein the bifunctional release agent is trifluoroethyl methacrylate.

13. The film of claim 5, wherein the bifunctional polymeric release agent is trifluoroethyl methacrylate.

14. The method of claim 9, wherein the bifunctional polymeric release agent is trifluoroethyl methacrylate.

* * * * *